US005581688A

United States Patent [19]

Jiang et al.

[11] Patent Number: 5,581,688

[45] Date of Patent: Dec. 3, 1996

[54] TELE- AND DATA COMMUNICATION SYSTEM

[75] Inventors: Hao Jiang, Stockholm; Klas I. Johansson, deceased, late of Lidingö, both of Sweden, by Gunnilla H. Johansson, legal representative

[73] Assignee: Telefonaktiebolaget LM Ericsson, Stockholm, Sweden

[21] Appl. No.: 233,411

[22] Filed: Apr. 28, 1994

[30] Foreign Application Priority Data

Apr. 29, 1993 [SE] Sweden .................................. 9301462

[51] Int. Cl.$^6$ ...................................................... G06F 11/34
[52] U.S. Cl. ............................... 395/182.01; 395/182.22; 395/185.01; 371/8.2
[58] Field of Search ...................................... 395/181, 180, 395/182.01, 182.05, 182.09, 182.11, 185.1, 182.22, 185.01; 371/7, 8.1, 8.2; 370/16

[56] References Cited

U.S. PATENT DOCUMENTS

| 3,665,174 | 5/1972 | Bouricius et al. . |
| 3,805,039 | 4/1974 | Stiffler . |
| 3,937,936 | 2/1976 | Saporito et al. . |
| 4,279,034 | 7/1981 | Baxter . |
| 4,393,490 | 7/1983 | Culley ......................................... 370/63 |
| 4,493,076 | 1/1985 | Khimèche et al. . |
| 4,543,651 | 9/1985 | Chang . |
| 4,964,125 | 10/1990 | Kim . |
| 5,014,220 | 5/1991 | McMann et al. . |
| 5,036,318 | 7/1991 | Bachhuber et al. . |
| 5,099,436 | 3/1992 | McCown et al. . |
| 5,109,380 | 4/1992 | Ogino . |
| 5,202,955 | 4/1993 | Hamilton et al. . |
| 5,249,261 | 9/1993 | Natarajan . |
| 5,257,363 | 10/1993 | Shapiro et al. . |

FOREIGN PATENT DOCUMENTS

| 0132916 | 2/1985 | European Pat. Off. . |
| 0140712 | 5/1985 | European Pat. Off. . |
| 0171231 | 2/1986 | European Pat. Off. . |
| 0240577 | 10/1987 | European Pat. Off. . |
| 0377249 | 7/1990 | European Pat. Off. . |
| 0074305 | 3/1993 | European Pat. Off. . |
| 3612730 | 10/1987 | Germany . |
| 455459 | 5/1988 | Sweden . |
| 8803738 | 5/1988 | WIPO .......................... H04Q 11/04 |

OTHER PUBLICATIONS

"Digraph Reliability Model Processing Advances and Applications," of Iverson, D. L. & Patterson–Hine, F.A.,A, published in AIAA Computing in Aerospace Conference, 9th, San Diego, CA, Oct. 19–21, 1993, Technical Papers, PT2 9A94–114ol 01–62), Washington, American Institute of Aeronautics and Astronautics, 1993, pp. 1189–1199. (See attached for remainder of technical articles).

Draft Recommendation I.432, "B–ISDN User Network Interface–Physical Layer Specification", COM XVIII–R 34–E, pp. 127–142, CCITT.

F. Halsall, *Data Communications, Computer Networks and OSI*, 2nd Edition, Addison–Wesley Publishing Company, pp. 98–103 (1988).

*Primary Examiner*—Robert W. Beausoliel, Jr.
*Assistant Examiner*—Albert Decady
*Attorney, Agent, or Firm*—Burns, Doane, Swecker & Mathis, L.L.P.

[57] ABSTRACT

The invention relates to a tele- and data communication system, including circuits containing transfer paths for data flows, and having functionality for error isolation of parts of the system. At least partially, where possible, parts of the circuits of the system are error isolated by logical partition into function blocks of two types. More particularly there is a first type, in which a complete corresponding function block need not necessarily become eliminated by an occurring error, and a second type in which the contrary is true. The transfer paths of a function block of the first type are isolated from each other for enabling shutting down such an erronous transfer path from traffic by software control.

4 Claims, 2 Drawing Sheets

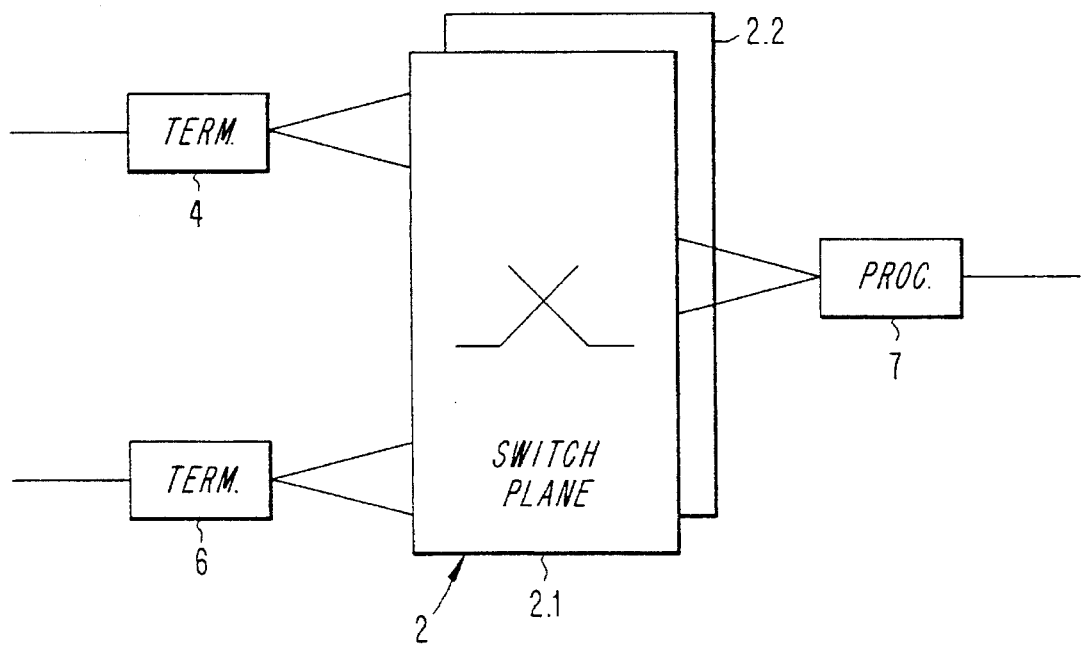
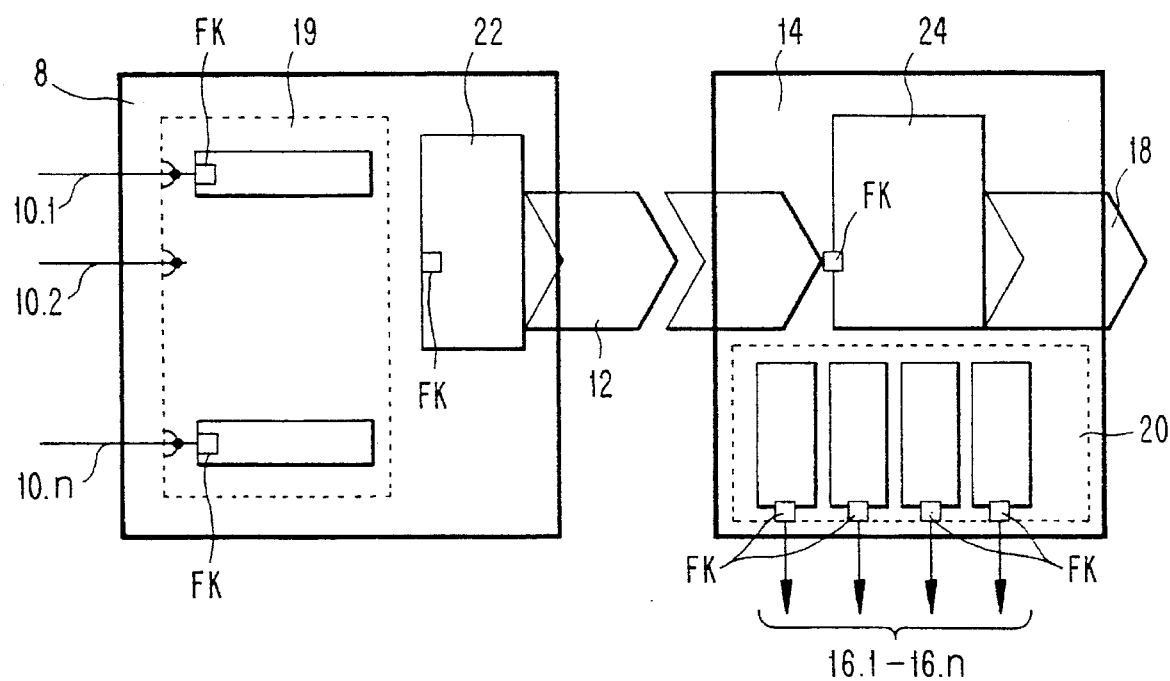

TELE- AND DATA COMMUNICATION SYSTEM

BACKGROUND

The invention relates to a tele- and data communication system, including circuits containing data flow transfer paths and having functionality for error isolation of parts of the system. By error isolation, or henceforth below mainly called "isolation" in short, of a system part is meant that there is functionality available for preventing that an error appearing in this system part affects other system parts.

High demands are put on system reliability and disturbance frequency in tele- and data communication systems. A meantime between system failures (MTBSF) of several thousand years, and disturbancy demands for a few repairs/a thousand subscriber years is not unusual. It has turned out that attainment of such features may increase the availability on an average connection a hundredfold in a realistic system.

Among known methods for increasing availability in an electronic system may be mentioned the use of redundant units on system or component level. This results in increased hardware costs and should be minimized to the greatest possible extent.

Usual is also isolation of a part unit of circuit type on a card or on a micro chip, which traditionally provides a satisfactory availability in many systems. The development of new circuits involves, however, that many circuits obtain an increasingly comprehensive functionality which in turn involves isolation/cut off of a greater part of systems in case of error situations.

Through Swedish Patent Publication SE,B, 455 459 a method is described for error supervision and increase of the availability in a digital switch network comprising partly doubled transfer paths and means for discovering and isolating errors in transfer paths and other devices included in the network.

In U.S. Pat. No. 5,036,318 there is described a modular ISDN communication system in which error information is formed in respectively assigned dependability system sub-modules from error reports of program control modules in a job-oriented manner and are transmitted to a system dependability sub-module.

U.S. Pat. No. 4,493,076 discloses a security system for an exchange having distributed control. Exchange control is distributed among a plurality of microprocessors and in microprocessor terminal units connected to a time-division switching network. The security system is organized on three levels.

In European Patent Publication EP,A1, 0 377 249 an integrated matrix memory is described which comprises standard sub-blocks and a redundant block. Each of the standard sub-blocks comprise a fixed number of standard sub-blocks. The redundant block comprises one or more redundant sub-blocks. For addressing there is provided a detector for the address of a faulty standard sub-block. In that case a redundant sub-block is selected. Selection is realized by way of a sub-bus which forms part of the data path.

In European Patent Publication EP,A1 0 240 577 there is disclosed an interface unit between a redundant dual-bus and a CPU and/or a data source with control and supervision logic and several encoders/decoders, as well as several transceivers connected to the bus lines. For increasing the functional safety and flexibility of the interface unit, there is connected between the transceivers and the encoders/decoders a multiplexer via which each encoder/decoder is connectable to each transceiver.

In German Patent Publication DE,A1 36 12 730 there is described a processor system with program and data memories which are addressable in blocks, which are controlled at times or once by means of self-test or diagnose programs. The system includes a spare memory consisting of a few blocks. When an erronous memory block is indicated the processor stops accessing it and the erronous block is replaced by a faultless block of the spare memory. In this faultless block the current program modules and/or data of the erronous block are stored, or, by means of a loading or generating program, the current programs and/or data are loaded. Thereupon the block is released for access by the operating program.

According to European Patent Publication EP,A3 0 074 305 logic elements are added to a conventional decoder to allow one or more defective blocks of columns to be isolated and one or more redundant blocks of columns to be substituted. The redundant block of columns is programmed by non-volatile latches. A repair address is stored in the latches. When the decoded address to a block of columns is the same as the repair address, the redundant block of columns is selected and all other blocks of columns are de-selected. Normal column block addressing is unaffected when the decoded address is different from the repair address.

In U.S. Pat. No. 3,937,936 there is described an equipment self repair apparatus utilizing the substitution of redundant circuits for a failure in any original operating logic module. The substitution is accomplished through the use of a multiplexer unit which disconnects the faulty circuit and switches a built-in spare in its place.

In U.S. Pat. No. 3,665,174 there is described an error tolerant arithmetic logical unit which is divided into vertical bit-planes which are relatively independent, being coupled mainly for the purposes of shifts and carry propagation. The system tolerates failures and still functions correctly by reconfiguring the unit through the control of interplane connections. By inserting a spare bit-plane into the system and switching between bit-planes to bypass a failed plane, the effect of the failed plane or of a failure in a position of control logic can be eliminated.

In U.S. Pat. No. 4,279,034 there is disclosed, for use in a digital communication system, a fault detector circuit operable for removing faulty stations from the system. The disclosed circuit uses a distributed bypass isolation technique and may be used with individual stations or with groups of stations. A multi-bit delay register is connected across each station or station group and the output of the delay register is compared with the output of the parallel stations. When differences in the compared bits are detected the parallel stations are immediately isolated from the system and the bits from the delay register are placed in the system to preserve synchronism.

In U.S. Pat. No. 3,805,039 system redundancy concept is disclosed wherein the system is divided into a number of substantially identical sub-elements wherein spare ones of the sub-elements may be substituted for failed ones of the sub-elements. The sub-elements and their corresponding loads are connected in a predetermined sequence. When one of the normally functioning sub-elements fails, the sub-elements following it in the sequence are disconnected from their corresponding loads then reconnected to the next load in the sequence. The last load in the sequence is reconnected to a spare sub-element.

In European Patent Publication EP,A3 0 140 712 a data transmission system comprising a plurality of reconfiguring devices and a method of reconfiguring such devices is described. Each device has a plurality of input and output data links, the devices being connected in a ring whereby for each reconfiguring device data is received on one data input link and transferred to one data output link such that data may be passed between all the reconfiguring devices along the ring. Each device includes fault recovery means for detecting the presence of a fault in the ring, the fault recovery means in different devices cooperating to attempt to cause data to be transmitted around a sub-ring when a fault is detected, the sub-ring being constituted at least partially by one or more of the previously unused data links to enable a number of the devices to continue to communicate; and merging means for detecting that a new reconfiguring device is connected to at least one pair of previously unused data input and output links and for reconfiguring the ring to include the new device.

In European Patent Publication EP,A3, 0 171 231 there is described a multistage switching network having a number of inputs and outputs comprising a plurality of switching elements arranged in an array of at least three stages. Inner groups of the stages define a plurality of nested modules where each of the switches in an outer stage is connected to associated subordinate inner modules such that at least one set of the connections between stages is redundant.

SUMMARY

The object of the present invention is to enable isolation also of parts of a circuit in a system of the kind defined by way of introduction.

This object has been attained in that the system according to the invention is characterized in that parts of the circuits of the system are error isolated by logical sub-division into function blocks of first and second types, of which a complete block of the first type is normally not susceptible to be eliminated by an occurring error, whereas a complete block of the second type is normally susceptible to be eliminated by an occurring error, and transfer paths of a function block of the first type are isolated from each other so as to enable shutting down of an erronous one of said transfer paths from operation by software control.

According to an advantageous embodiment a system model for controlling said system has a hierarchic design comprising a superior error handling function, a superior software level and a hardware level, each of said levels containing reporting and controlling functions in several steps, wherein a function step in the software level contains software objects corresponding to circuit functions which may require to be isolated, and reporting to and being controlled by said superior error handling function, a function step in the hardware level contains error reporting functions reporting to and being controlled by said software objects, and obtaining information about occurring errors from said circuit functions which may require isolation.

Preferably said first and second types of function blocks are parallel and serial function blocks, respectively, for parallel and serial connections, respectively.

According to a favourable embodiment said circuits are included in at least two redundant units and such a redundant unit is chosen for each single transfer path in function blocks of the first type.

In an ATM switch the redundant units may preferably be redundant switch planes.

BRIEF DESCRIPTION OF THE DRAWINGS

Embodiments of the invention will now be described more closely below with reference to the drawings on which FIG. 1 very schematically illustrates an ATM switch (ATM Asynchronous Transfer Mode) in a telecom system, FIG. 2 likewise schematically illustrates two interconnected circuits which may be included in a switch according to FIG. 1, FIG. 3 in the form of a block diagram illustrates the mapping between hardware and software functions for error supervision and control of a system in which circuits exposed to errors of the kind here intended may be included.

DETAILED DESCRIPTION

Figure 3:
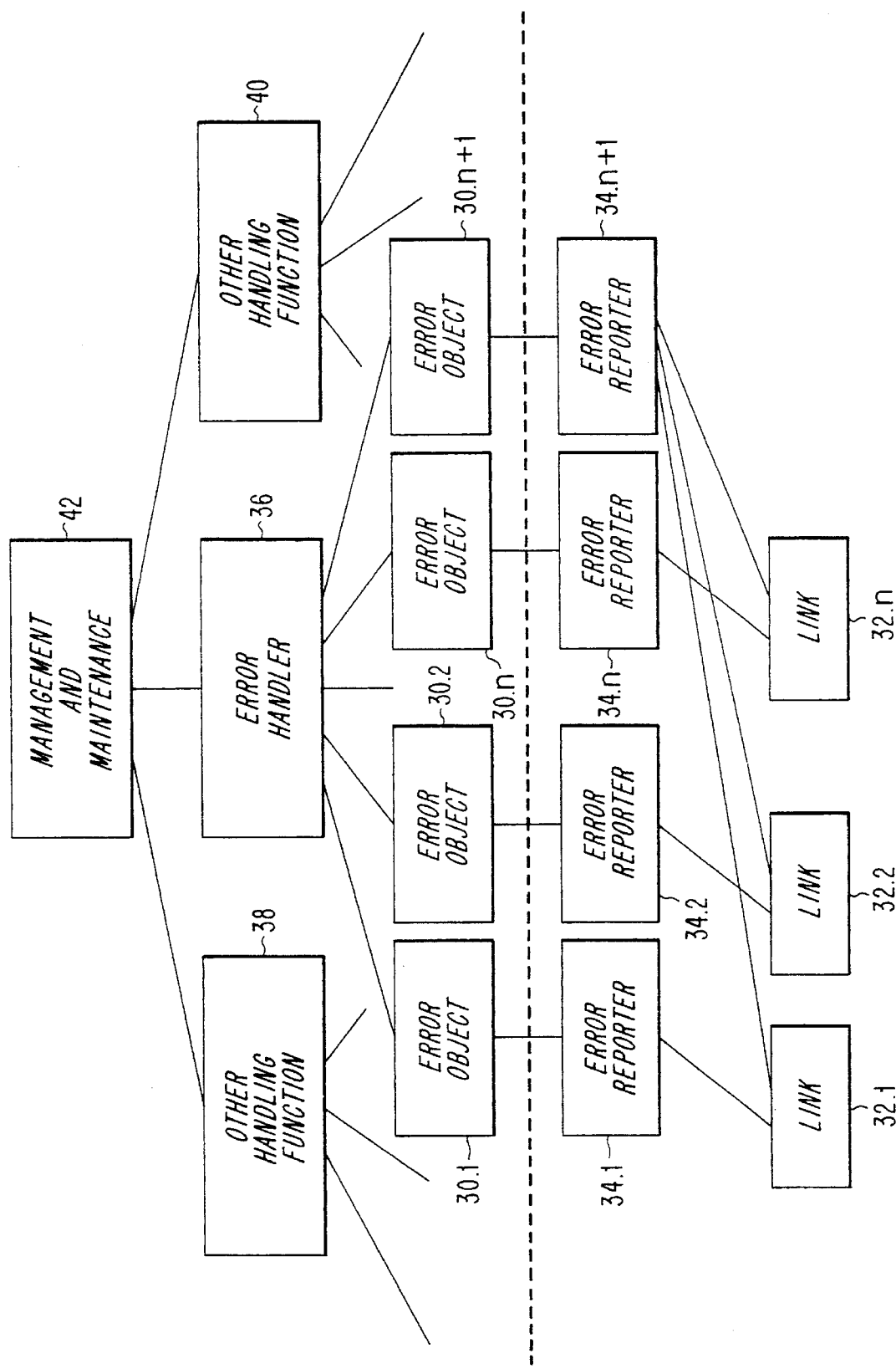

The invention is based upon isolation of hardware as well as software. The hardware isolation is made on a circuit level in a way to be described more closely below, combined with two or more redundant units on a system level.

FIG. 1 illustrates an ATM switch 2 in a telecom system. In a way well known to the man of the art the switch may be connected for handling traffic in the form of cells, i.e. data packets of a constant length, between first and second sets of terminal means, which may be related to each other e.g. by one end means of each set forming the input and output, respectively, of an apparatus. This is exemplified in FIG. 2 by two terminating devices 4 and 6 being imagined to form input and output of a processor 7.

The switch 2 consists of two redundant units in the form two planes via the switch planes 2.1 and 2.2.

Each switch plane may, as an example, contain circuits of the type shown in FIG. 2. One circuit 8 has input parallel links 10.1 ... 10.n, for parallel traffic from e.g. terminal means associated with said first set and output serial links 12 for serial traffic to a circuit 14. The circuit 14, in turn, has output parallel links 16.1 ... 16.n, to e.g., terminal means associated with said second set. A part of the serial traffic from the circuit 8 may also be further connected via the circuit 14 to output serial links 18, which may be extended to further series connected circuits of a kind e.g. similar to the circuit 14.

More particularly, the circuits 8 and 14 shown in FIG. 2 may e.g. form part of a so called Pipe structure included in a square switch architecture according to PCT/SE93/00474, corresponding to U.S. patent application 08/067012, the contents of which being hereby incorporated by reference. Therefore, a closer description of circuits 8, 14 or the design or function of such a switch architecture is not needed here.

According to one of the features of the invention parts of circuits, such as circuits 8 and 14, are isolated by logical division into function blocks of two types, where possible. More particularly, there is a first type in which a corresponding function block need not necessarily be completely eliminated by an occurring error, and another type in which the contrary is true.

An example of how to perform such an isolation is shown in FIG. 2, in which each of the circuits 8 and 14 is logically divided into parallel function blocks 19 and 20, respectively, of the first type, on the one hand, and serial function blocks 22 and 24, respectively, of the second type, on the other hand. By this function partition measures can be taken, as will be described more closely below, for preventing that the whole circuit must be regarded as eliminated by a single error in one of the links 10 in the circuit 8, and in one of the links 16 in the circuit 14, respectively. In combination with a plane doubled structure in an ATM switch according to FIG. 1, this implies that, as concerns the blocks 18 and 20, the choice of plane may be made for each link instead of for a plurality of links. Both reliability and quality will be improved.

As concerns the blocks 22 and 24 the errors occurring in these are such that they eliminate the whole circuit and thereby the whole chain of corresponding circuits included in the serial connection, e.g. errors in a cap, bond wires, power feed and clock distribution in the circuit.

Each one of the blocks 18–24 has its own error intensity which, as concerns the blocks 18 and 20 is proportional to the area of the function block in question. Error supervision points have been marked FK in FIG. 2. Their location is made with regard to localizing errors, e.g. for pointing out erronous cards. For error checks there may be used some form of mechanism known per se. ATM uses e.g. HEC (Header Error Control), which is described in CCITT Draft Recommendation I.432, "B-ISDN User Network Interface—Physical Layer Specification". More particularly, HEC is a type of CRC (Cyclic Redundancy Check), which is described in "Data Communications, Computer Networks and OSI" by Fred Halsall, Addison-Wesley, page 98.

By making, as described above with reference to FIGS. 1 and 2, the redundancy termination on a level corresponding to functionality in part of a circuit, it will be of interest to make an isolation plus shutting off of parts of circuits in case of errors. The rest of the circuit will then work before the next repair. Data from the erronous blocks are replaced by corresponding data in the other plane meanwhile. A higher average availability may thereby be offered to the users.

The isolation mechanism in hardware is based, in a way described more closely above, on a circuit design with a suitable block division combined with error checks (e.g. according to the above, or parity checks), making that errors in a certain link will not be propagated to other serial links. Data from the erronous link may then be rejected at the same time as this will be reported upwardly to the software level.

The error intensity in today's VLSI circuits to a great part originates from the chip itself, making that the proportion between the error intensity in parallel and serial blocks is determined by their complexity. Certain designs involve that the error intensity in a serial block is a fraction of that of the whole circuit.

With reference to FIG. 3 the system model used for controlling the system in which circuits exposed to errors are included, e.g. an ATM switch according to FIG. 1, should have software objects 30.1, 30.2 ... 30.n, 30.n+1, corresponding to the circuit functions 32.1, 32.2 ... 32.n, 32.n+1, being of interest for isolation, i.e. the serial and parallel links in the embodiment described above with reference to FIG. 2. The software objects 30 will also be referred to as error objects below.

More particularly, FIG. 3 shows a hierarchic design with report functions in several steps. In the embodiment shown all paths are double directed, i.e. the reporting information flows upwardly and the control information downwardly. The information about arisen errors in concerned hardware paths 32.1, 32.2 ... 32.n, e.g. parallel and serial data links according to FIG. 2, are filtered by a lowest level of reporting functions 34.1, 34.2 ... 34.n, 34.n+1, which may be a counter plus a control mechanism, and are then sent further to the error objects 30 in the software level. Different error cases are handled by different error objects 30 and are reported to an error handling function 36 arranged to divert the traffic so that the error effects will be minimized.

In the same level as the function 36 other handling functions may be provided, such as indicated at 38 and 40. The highest level in the software part is represented by a management and maintenance function 42.

The supervision of cells passing through the switch according to the above is performed by the error reporting functions 34 observing the checksum of the cells. By means of a statistic function, e.g. a sequential error counter with a programmable reset and threshold level, in all FKs included in circuits 19–24, a differing checksum is indicated as a disturbance and the counter is stepped. If the threshold level for errors is exceeded it is reported that an error exists to an error object 30 in the software.

At off peak hours own cells are sent on the links 10 in even intervals for supervising the hardware.

If a disturbance is indicated in some FK for a cell an immediate error isolation is performed by rejecting the cell.

If an error exists in some of the error reporting functions 34 this is reported to a corresponding error object 30 in the software which transmits an error signal to the error handling function 36. The error handler 36 puts together error signals from one or several error objects 30. An analysis is performed for finding out in which FK the flow of cells shall be shut off.

The shutting off is made according to the principle that a portion as small as possible shall be shut off for isolating the error. When the analysis is ready a shutting off signal is sent to the chosen FK in the hardware from the error handler 36.

A hierarchic structure of the kind indicated above has different time constants on different levels which permits an effective error isolation. By this division of software and hardware the characteristics of the system may be changed without need for re-designing the hardware.

What is claimed is:

1. A tele- and data communication system, comprising a plurality of circuits containing data flow transfer paths and having functionality for error isolation of parts of the system, wherein the circuits have parts that are error isolated by logical subdivision into function blocks of first and second types, of which a complete function block of the first type is normally not susceptible to be eliminated by an occurring error, and a complete function block of the second type is normally susceptible to be eliminated by an occurring error, and data flow transfer paths of a function block of the first type are isolated from each other so as to enable selective shutting down of an erroneous one of said transfer paths from operation, and the tele- and data communication system further comprising a system model for controlling said system and having a hierarchic design comprising a superior error handling function a superior software level and a hardware level, each of said levels containing reporting and controlling functions in several steps, wherein a function step in the software level contains software objects corresponding to circuit functions which may require to be isolated, and reporting to and being controlled by said superior error handling function, and a function step in the hardware level contains error reporting functions reporting to and being controlled by said software objects, and obtaining information about occurring errors from said circuit functions which may require isolation.

2. A system according to claim 1, wherein the first and second types of function blocks are parallel and serial function blocks, respectively, for parallel and serial connections, respectively.

3. A system according to claim 1, wherein the circuits are included in at least two redundant units and a redundant unit is chosen for each single data flow transfer path in function blocks of the first type.

4. A system according to claim 3, wherein the redundant units are redundant switch planes in an ATM switch.

* * * * *